(12) United States Patent
Lee et al.

(10) Patent No.: US 11,489,192 B2
(45) Date of Patent: Nov. 1, 2022

(54) LITHIUM SECONDARY BATTERY

(71) Applicant: SAMSUNG SDI CO., LTD., Yongin-si (KR)

(72) Inventors: Eunsung Lee, Yongin-si (KR); Changwook Kim, Yongin-si (KR); Sangin Park, Yongin-si (KR); Sooyoun Park, Yongin-si (KR); Young Jin Park, Yongin-si (KR)

(73) Assignee: SAMSUNG SDi CO., LTD., Yongin-si (KR)

( * ) Notice: Subject to any disclaimer, the term of this patent is extended or adjusted under 35 U.S.C. 154(b) by 324 days.

(21) Appl. No.: 16/630,013

(22) PCT Filed: Jul. 10, 2018

(86) PCT No.: PCT/KR2018/007801
§ 371 (c)(1),
(2) Date: Jan. 10, 2020

(87) PCT Pub. No.: WO2019/013521
PCT Pub. Date: Jan. 17, 2019

(65) Prior Publication Data
US 2020/0136172 A1 Apr. 30, 2020

(30) Foreign Application Priority Data
Jul. 13, 2017 (KR) .......................... 10-2017-0089189

(51) Int. Cl.
*H01M 4/131* (2010.01)
*H01M 10/0525* (2010.01)
(Continued)

(52) U.S. Cl.
CPC ....... *H01M 10/0525* (2013.01); *H01M 4/366* (2013.01); *H01M 4/485* (2013.01);
(Continued)

(58) Field of Classification Search
CPC .. H01M 10/0525; H01M 4/366; H01M 4/485; H01M 4/505; H01M 4/525;
(Continued)

(56) References Cited

U.S. PATENT DOCUMENTS 5,679,481 A 10/1997 Takanishi et al.
9,564,628 B2 2/2017 Kim et al.
(Continued)

FOREIGN PATENT DOCUMENTS

CN 1795574 6/2006
CN 1855588 11/2006
(Continued)

OTHER PUBLICATIONS

Machine translation of JP 2008-016232, retrieved from <www.espacenet.com> on Mar. 4, 2022.*
(Continued)

*Primary Examiner* — Cynthia K Walls
(74) *Attorney, Agent, or Firm* — H.C. Park & Associates, PLC

(57) ABSTRACT

The invention relates to a lithium secondary battery including a positive electrode, a negative electrode including a negative active material, and an electrolyte, wherein the positive electrode includes a first positive active material of a lithium manganese cobalt oxide in Chemical Formula 1, and a second positive active material of a lithium transition metal oxide that occludes and releases lithium ions; an average particle diameter (D50) of the first positive active material is smaller than an average particle diameter (D50) of the second positive active material; and the first positive active material has lower first charge/discharge efficiency than that of the negative active material and has an irreversible capacity during the first charge/discharge that is larger
(Continued)

than an irreversible capacity during the first charge/discharge of the negative active material.

7 Claims, 3 Drawing Sheets

(51) Int. Cl.
| | | |
|---|---|---|
| H01M 4/36 | (2006.01) | |
| H01M 4/485 | (2010.01) | |
| H01M 4/505 | (2010.01) | |
| H01M 4/525 | (2010.01) | |
| H01M 50/46 | (2021.01) | |
| H01M 50/449 | (2021.01) | |
| H01M 4/02 | (2006.01) | |

(52) U.S. Cl.
CPC ........... *H01M 4/505* (2013.01); *H01M 4/525* (2013.01); *H01M 50/449* (2021.01); *H01M 50/46* (2021.01); *H01M 2004/027* (2013.01); *H01M 2004/028* (2013.01)

(58) Field of Classification Search
CPC ............... H01M 50/449; H01M 50/46; H01M 2004/027; H01M 2004/028; H01M 4/364; H01M 4/131; H01M 10/052; Y02E 60/10
See application file for complete search history.

(56) References Cited

U.S. PATENT DOCUMENTS

| | | |
|---|---|---|
| 2006/0263690 A1 | 11/2006 | Suhara et al. |
| 2006/0263691 A1 | 11/2006 | Park et al. |
| 2007/0122703 A1 | 5/2007 | Whitfield et al. |
| 2007/0212609 A1 | 9/2007 | Iwami |
| 2010/0086854 A1 | 4/2010 | Kumar et al. |
| 2012/0107680 A1 | 5/2012 | Amiruddin |
| 2012/0164533 A1 | 6/2012 | Senoue et al. |
| 2013/0149560 A1 | 6/2013 | Viavattine et al. |
| 2013/0302685 A1 | 11/2013 | Kim et al. |
| 2016/0156032 A1 | 6/2016 | Lee et al. |
| 2017/0084915 A1 | 3/2017 | Hah et al. |
| 2017/0133684 A1 | 5/2017 | Han et al. |

FOREIGN PATENT DOCUMENTS

| | | | |
|---|---|---|---|
| CN | 103190026 | | 7/2013 |
| CN | 105098188 | | 11/2015 |
| CN | 105702961 | | 6/2016 |
| CN | 106654184 | | 5/2017 |
| JP | 2000-011993 | | 1/2000 |
| JP | 2008-016232 | * | 1/2008 |
| JP | 2012-504316 | | 2/2012 |
| KR | 10-1996-0019833 | | 6/1996 |
| KR | 10-2005-0030899 | | 3/2005 |
| KR | 10-2006-0018110 | | 2/2006 |
| KR | 10-2007-0093330 | | 9/2007 |
| KR | 10-2009-0078128 | | 7/2009 |
| KR | 10-2009-0111549 | | 10/2009 |
| KR | 10-2013-0125236 | | 11/2013 |
| KR | 10-2016-0064881 | | 6/2016 |
| WO | 2015/141997 | | 9/2015 |

OTHER PUBLICATIONS

Machine translation of KR 10-2008-0045855, retrieved from <http://kposd.kipo.go.kr:8088/up/kpion/ on Mar. 4, 2022.*
International Search Report dated Feb. 19, 2019, in International Application No. PCT/KR2018/007801 (with English Translation).
Office Action dated Nov. 22, 2021 from the Chinese Patent Office for Chinese Patent Application No. 201880046627.7.

* cited by examiner

LITHIUM SECONDARY BATTERY

CROSS REFERENCE TO RELATED APPLICATION

This application is a National Stage Entry of International Patent Application No. PCT/KR2018/007801, filed on Jul. 10, 2018, and claims priority from and the benefit of Korean Patent Application No. 10-2017-0089189, filed on Jul. 13, 2017, each of which is incorporated by reference for all purposes as if fully set forth herein.

BACKGROUND

Field

A lithium secondary battery is disclosed.

Discussion of the Background

A portable information device such as a cell phone, a laptop, smart phone, and the like or an electric vehicle has used a lithium secondary battery.

The lithium secondary battery is composed of a positive electrode, a negative electrode, and an electrolyte. As for a positive active material of a positive electrode, a lithium-transition metal oxide having a structure capable of intercalating lithium ions such as $LiCoO_2$, $LiMn_2O_4$, $LiNi_{1-x}Co_xO_2$ (0<x<1), and the like has been used. Among these, lithium cobalt oxide ($LiCoO_2$) is the most widely used positive active material.

Recently, demands for increasing the energy density of lithium secondary batteries are rapidly increasing. Since the energy density of the lithium secondary battery is determined by the reversible capacities of the positive active material and the negative active material, various studies have been conducted in order to increase the reversible capacities of the positive active material and the negative active material.

In order to increase the reversible capacity of lithium secondary battery, a charge voltage (4.3V vs. Li/Li), which can be currently used, should be increased and for this purpose, development of lithium secondary battery with charge voltage of more than or equal to 4.5V vs. Li/Li$^+$ has been conducted.

In addition, since charge and discharge efficiency of the first cycle of a positive active material, for example $LiCoO_2$, is high to be 98% to 99%, while charge and discharge efficiency of the first cycle of a negative active material, for example graphite, is somewhat low to be 92% to 94%, reversible capacity of the lithium secondary battery may be determined by a reversible capacity of the negative electrode.

SUMMARY

Therefore, to increase the reversible capacity of the lithium secondary battery, it is necessary to increase the charge and discharge efficiency of the negative electrode. An embodiment is to provide a lithium secondary battery exhibiting excellent energy density. An embodiment of the invention includes a lithium secondary battery that includes a positive electrode, a negative electrode including a negative active material, and an electrolyte, wherein the positive electrode includes a first positive active material of a lithium manganese cobalt-based oxide of Chemical Formula 1 and a second positive active material of a lithium transition metal oxide that intercalates and deintercalates lithium ions, an average particle diameter (D50) of the first positive active material is smaller than an average particle diameter (D50) of the second positive active material, and the first positive active material has lower first charge/discharge efficiency than that of the negative active material and has an irreversible capacity during the first charge/discharge which is larger than an irreversible capacity of the negative active material during the first charge/discharge.

  [Chemical Formula 1]

In Chemical Formula 1, a=1.2−b, x=0.4−2b, y=0.4−k+3b, 0≤b≤0.03, 0≤k≤0.4, a+x+y+k=2, and $M^1$ is Cr, Ru, or a combination thereof.

The second positive active material may be a lithium cobalt oxide-based represented by Chemical Formula 2.

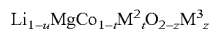  [Chemical Formula 2]

In Chemical Formula 2, 0<u≤0.01, 0≤t<0.02, 0≤z<0.01, $M^2$ is Group 3 to 13 elements, and $M^3$ is F, Cl, Br, or a combination thereof.

In an embodiment of the invention, $M^2$ may be Ti, V, Ni, Fe, Nb, Mo, Al, Zr, Mn, or a combination thereof.

The average particle diameter (D50) of the first positive active material may be 1 μm to 5 μm. In addition, the average particle diameter (D50) of the second positive active material may be 10 μm to 20 μm.

A ratio of the average particle diameter (D50) of the second positive electrode active material to the average particle diameter (D50) of the first positive electrode active material, that is, the average particle diameter (D50) of the second positive electrode active material/average particle diameter (D50) of the first positive electrode active material may be 2 to 20.

A mixing ratio of the first positive electrode active material and the second positive electrode active material may be a 10:90 to 1:99 weight ratio.

An atomic ratio (u/(1−t)) of Mg/Co in the second positive active material may be 0.0035 to 0.01.

Other embodiments of the invention are included in the following detailed description.

The lithium secondary battery according to an embodiment may exhibit an excellent energy density by including a positive active material that provide a lot of lithium ions during charge and discharge, thereby may increasing charge and discharge efficiency of the negative electrode.

DETAILED DESCRIPTION

Figure 1:
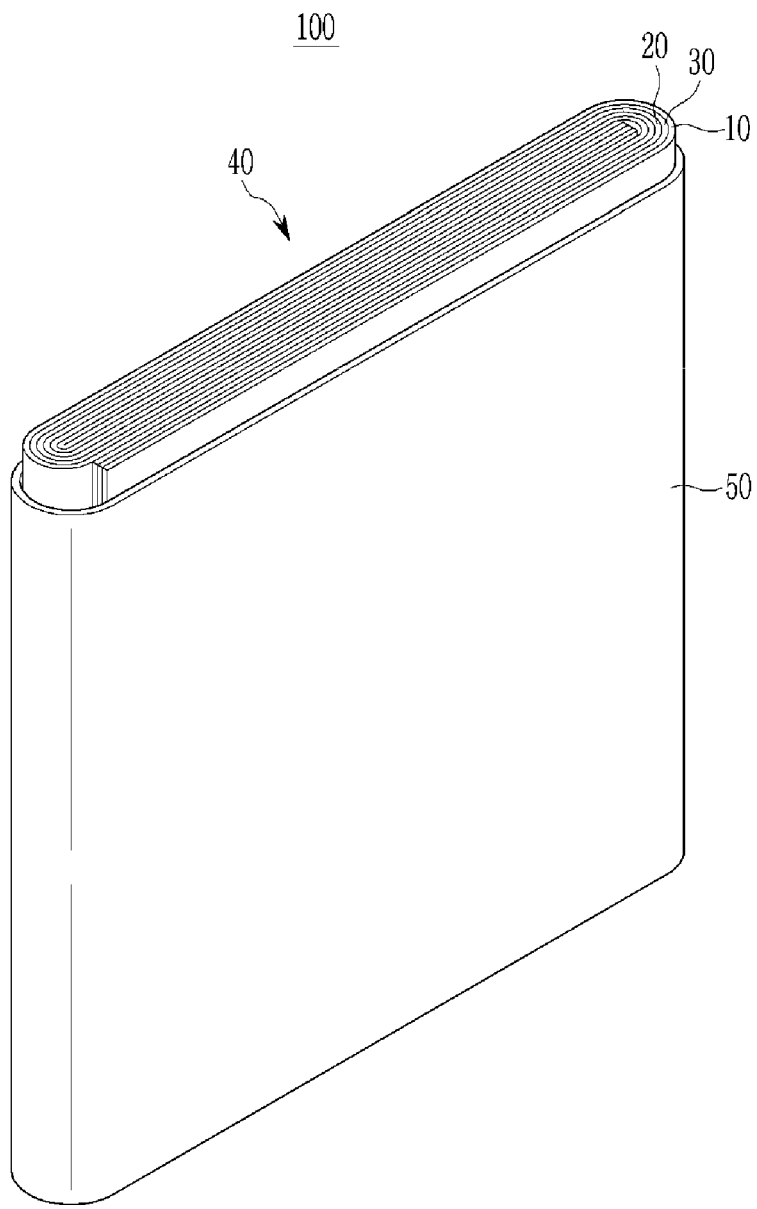
FIG. 1 is a schematic view showing a structure of a lithium secondary battery according to an embodiment.

Exemplary embodiments will hereinafter be described in the detailed description. However, these are presented as examples, by which the invention is not limited and the invention is only defined by the scope of the claims to be described later.

A lithium secondary battery according to an embodiment of the invention includes a positive electrode, a negative electrode including a negative active material, and an electrolyte, wherein the positive electrode includes a first positive active material of a lithium manganese cobalt-based oxide of Chemical Formula 1 and a second positive active material of a lithium transition metal oxide that intercalates and deintercalates lithium ions.

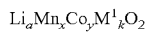   [Chemical Formula 1]

$Li_aMn_xCo_yM^1_kO_2$

In Chemical Formula 1, a=1.2−b, x=0.4−2b, y=0.4−k+3b, 0≤b≤0.03, 0≤k≤0.4, a+x+y+k=2, and $M^1$ is Cr, Ru, or a combination thereof.

In Chemical Formula 1, when a and x is in the ranges, an appropriate sacrificial positive electrode characteristics may be obtained.

In addition, in the first positive active material represented by Chemical Formula 1, x:y+k may be 1:1 more appropriately. When x:y+k is 1:1, a concentration of Co and $M^1$ (Cr, Ru, or a combination thereof) may be increased while Mn may maintain a tetravalent value ($^+4$) and therefore, a sacrificial positive electrode that may mostly increase the first cycle charge may be obtained.

The second positive active material may be a lithium cobalt-based oxide of Chemical Formula 2, at least one lithium nickel oxide of $Li_aNi_{1−b−c}Co_bX_cD_\alpha$ (0.90≤a≤1.8, 0≤b≤0.5, 0≤c≤0.5, 0≤α≤2); $Li_aNi_{1−b−c}Co_bX_cO_{2−\alpha}T_\alpha$ (0.90≤a≤1.8, 0>b≤0.5, 0≤c≤0.05, 0≤α<2); $Li_aNi_{1−b−c}Co_bX_cO_{2−\alpha}T_2$ (0.90≤a≤1.8, 0≤b≤0.5, 0≤c≤0.05, 0≤α≤2); $Li_aNi_{1−b−c}Mn_bX_cD_\alpha$ (0.90≤a≤1.8, 0≤b≤0.5, 0≤c≤0.05, 0≤α≤2); $Li_aNi_{1−b−c}Mn_bX_cO_{2−\alpha}T_\alpha$ (0.90≤a≤1.8, 0≤b≤0.5, 0≤c≤0.05, 0≤α≤2); $Li_aNi_{1−b−c}Mn_bX_cO_{2−\alpha}T_2$ (0.90≤a≤1.8, 0≤b≤0.5, 0≤c≤0.05, 0≤α≤2); $Li_aNi_bE_cG_dO_2$ (0.90≤a≤1.8, 0≤b≤0.9, 0≤c≤0.5, 0.001≤d≤0.1); $Li_aNi_bCo_cMn_dG_eO_2$ (0.90≤a≤1.8, 0≤b≤0.9, 0≤c≤0.5, 0≤d≤0.5, 0.001≤e≤0.1); and $Li_aNiG_bO_2$ (0.90≤a≤1.8, 0.001≤b≤0.1), or a combination of the lithium cobalt oxide and the lithium nickel oxide. According to an embodiment, the second positive active material may be the lithium cobalt-based oxide of Chemical Formula 2.

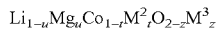   [Chemical Formula 2]

$Li_{1−u}Mg_uCo_{1−t}M^2_tO_{2−z}M^3_z$

In Chemical Formula 2, 0<u≤0.01, 0≤t<0.02, 0≤z≤0.01, $M^2$ is Group 3 to 13 elements, and $M^3$ is F, Cl, Br, or a combination thereof. In an embodiment of the invention, $M^2$ may be Ti, V, Ni, Fe, Nb, Mo, Al, Zr, Mn, or a combination thereof.

As shown in Chemical Formula 2, the second positive active material is a material in which Mg substitutes a part of Li, that is, is inserted into a Li site. When Mg is inserted into the Li site, when the charge and discharge is performed using this positive active material, Mg acts as a pillar to support the empty Li layer, thereby maintaining a structure of the second positive active material well and thus cycle-life characteristics may be further improved. In addition, the composition represented by Chemical Formula 2 is a composition in which Mg is inserted into the Li site, and particularly when the Mg content is less than or equal to 1 mol % (u is less than 0.01), an optimal effect on the cycle-life characteristic improvement may be obtained and the capacity is not decreased.

In addition, magnesium ion included in the second positive active material is present in the space in the lithium layer, so even when the lithium ion is completely released from the lithium layer in a high voltage region, an $O_3$ structure, which is a basic structure of the lithium cobalt composite oxide, is well maintained, thereby suppressing the problem that and the $O_3$ structure collapses and is changed into H1-3 and O1 structures having poor reversibility during charge and discharge.

The $M^3$ lowers an oxidation number of Co, which may improve chemical stability of lithium cobalt composite oxide during charge. Particularly, this effect is most appropriate when using F, Cl, or Br as $M^3$.

Unless otherwise defined herein, an average particle diameter (D50) refers to the diameter of the particles having a cumulative volume of 50% by volume in the particle size distribution.

In an embodiment of the invention, the average particle diameter (D50) of the first positive active material is suitably smaller than the average particle diameter (D50) of the second positive active material. When the average particle diameter (D50) of the first positive active material is larger than the average particle diameter (D50) of the second positive active material, electrical conductivity of the first positive active material is low, and thus an effect of the first positive active material may not be desirably obtained. In an embodiment, the first positive active material may serve as a sacrificial electrode, and in case that the average particle diameter (D50) of the first positive active material is larger than the average particle diameter (D50) of the second positive active material, the first positive active material cannot effectively serve as a sacrificial positive electrode.

The average particle diameter (D50) of the first positive active material refers to an average particle diameter (D50) of the secondary particle formed by assembling the primary particles of the compound represented by Chemical Formula 1.

The average particle diameter (D50) of the first positive active material may be 1 μm to 5 μm. When the average particle diameter (D50) of the first positive electrode active material is included in the above range, high capacity may be obtained. In addition, the average particle diameter (D50) of the second positive electrode active material may be 10 μm to 20 μm. When the average particle diameter (D50) of the second positive active material is included in the range, the electrode active mass density may be further increased.

A ratio of the average particle diameter (D50) of the second positive electrode active material to the average particle diameter (D50) of the first positive electrode active material, that is, the average particle diameter (D50) of the second positive electrode active material/average particle diameter (D50) of the first positive electrode active material may be 2 to 20. When the ratio of the average particle diameter (D50) of the second positive active material to the first positive active material is within the range, the electrode active mass density may be further increased.

The weight mixing ratio of the first positive active material and the second positive active material may be 10:90 to 1:99 weight ratio. When the mixing ratio of the first positive active material and the second positive active material falls in the range, it is appropriate to maintain a sacrificial positive electrode characteristics of the first positive active material and cycle-life characteristics of the mixed active material better.

As the first positive active material, the compound represented by Chemical Formula 1 is appropriate, and the first positive active material may provide more lithium ion than the second positive active material at the first cycle charge of the battery, and the provided lithium ions are moved to the negative electrode, thereby reacting with the electrolyte solution to form a solid electrolyte interface (SEI) film, and further increasing an amount of charge of the negative electrode. Therefore, it is possible to increase a discharge amount of the negative electrode during the first cycle discharge, and it is possible to increase an amount of reversibly used lithium ions during charge and discharge of the subsequent cycle.

In addition, the first positive active material represented by Chemical Formula 1 is a lithium manganese cobalt-based oxide, which does not include Ni, as a high-capacity positive active material of about 400 mAh/g or more, and when the first positive active material is used as a second positive active material with the compound of Chemical Formula 2, a higher charge capacity may be achieved at low voltages, for example voltages of 4.5 V or less. If Ni is added to Chemical Formula 1 as the first positive active material, electrical conductivity and charge capacity may be decreased.

In addition, the first positive active material in combination with the second positive active material has a lower first charge/discharge efficiency than that of the second positive active material by itself and not in combination with the first positive active material, and wherein the first positive active material in combination with the second positive active material has a reversible capacity during the first charge/discharge which is larger than a reversible capacity of the second positive active material by itself and not in combination with the first positive active material during the first charge/discharge.

An atomic ratio (atomic ratio, u/(1−t)) of Mg/Co in the second positive active material may be 0.0035 to 0.01. When the atomic ratio of Mg/Co is included in this range, it is possible to effectively suppress a phase transition occurring in a high voltage region, thereby improving stability at a high voltage, and increasing charge and discharge capacity and cycle-life characteristics. The high voltage region may for example range from 4.55V to 4.63V.

Specific examples of the first positive active material may be $Li_{1.2}Mn_{0.4}Co_{0.4}O_2$, $Li_{1.2}Mn_{0.4}Cr_{0.4}O_2$, $Li_{1.2}Mn_{0.4}Ru_{0.4}O_2$, or a combination thereof. In addition, specific examples of the second positive active material may be $Li_{0.9925}Mg_{0.0075}CoO_2$, $Li_{0.995}Mg_{0.005}CoO_2$, $Li_{0.99325}Mg_{0.00675}CoO_2$, $Li_{0.99625}Mg_{0.00375}CoO_2$, $Li_{0.99}Mg_{0.01}CoO_2$, or a combination thereof.

The positive electrode including the positive active material according to an embodiment of the invention includes a positive active material layer, a current collector supporting the positive active material. In the positive active material layer, a content of the positive active material may be 90 wt % to 98 wt % based on a total weight of the positive active material layer.

In an embodiment of the invention, the positive active material layer may further include a binder and a conductive material. Herein, the binder and the conductive material may be included in an amount of 1 wt % to 5 wt %, respectively based on the total amount of the positive active material layer.

The binder improves binding properties of positive active material particles with one another and with a current collector. Examples of the binder may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to provide electrode conductivity and any electrically conductive material may be used as a conductive material unless it causes a chemical change. Examples of the conductive material may include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may use aluminum, but is not limited thereto.

The negative electrode includes a current collector and a negative active material layer disposed on the current collector and including a negative active material.

The negative active material may include a material that reversibly intercalates/deintercalates lithium ions, a lithium metal, a lithium metal alloy, a material capable of doping/dedoping lithium, or transition metal oxide.

The material that reversibly intercalates/deintercalates lithium ions may include a carbon material, that is, any generally-used carbon-based negative active material in a lithium ion secondary battery and examples thereof may include crystalline carbon, amorphous carbon, or mixtures thereof. Examples of the crystalline carbon may be amorphous, sheet-shaped, flake, spherical shape, or fiber-shaped natural graphite or artificial graphite and examples of the amorphous carbon may be a soft carbon, a hard carbon, a mesophase pitch carbonization product, fired coke, and the like.

The lithium metal alloy includes an alloy of lithium and a metal selected from Na, K, Rb, Cs, Fr, Be, Mg, Ca, Sr, Si, Sb, Pb, In, Zn, Ba, Ra, Ge, Al, and Sn.

The material capable of doping/dedoping lithium may be Si, a Si—C composite, $SiO_x$ (0<x<2), a Si-Q alloy (wherein Q is an element selected from an alkali metal, an alkaline-earth metal, a Group 13 element, a Group 14 element, a Group 15 element, a Group 16 element, a transition metal, a rare earth element, and a combination thereof, and not Si), Sn, $SnO_2$, a Sn—R alloy (wherein R is an element selected from an alkali metal, an alkaline-earth metal, a Group 13 element, a Group 14 element, a Group 15 element, a Group 16 element, a transition metal, a rare earth element, and a combination thereof, and not Sn) and the like and at least one of these materials may be mixed with $SiO_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

The transition metal oxide may include a vanadium oxide, a lithium vanadium oxide, or a lithium titanium oxide.

In the negative active material layer, the negative active material may be included in an amount of 95 wt % to 99 wt % based on a total weight of the negative active material layer.

In an embodiment of the invention, the negative active material layer includes a binder, and optionally a conductive material. In the negative active material layer, a content of the binder may be 1 wt % to 5 wt % based on a total weight of the negative active material layer. When the negative active material layer includes a conductive material, the negative active material layer includes 90 wt % to 98 wt % of the negative active material, 1 wt % to 5 wt % of the binder, and 1 wt % to 5 wt % of the conductive material.

The binder improves binding properties of negative active material particles with one another and with a current collector. The binder includes a non-water-soluble binder, a water-soluble binder, or a combination thereof.

The non-water-soluble binder may be selected from polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may be a styrene-butadiene rubber, an acrylated styrene-butadiene rubber (SBR), an acrylonitrile-butadiene rubber, an acrylic rubber, a butyl rubber, a fluorine rubber, an ethylenepropylene copolymer, polyepichlorohydrine, polyphosphazene, polyacrylonitrile, polystyrene, an ethylene propylene diene copolymer, polyvinylpyridine, chlorosulfonated polyethylene, latex, a polyester resin, an acrylic resin, a phenolic resin, an epoxy resin, polyvinyl alcohol, and a combination thereof.

When the water-soluble binder is used as a negative electrode binder, a cellulose-based compound may be further used to provide viscosity as a thickener. The cellulose-based compound includes one or more of carboxymethyl cellulose, hydroxypropylmethyl cellulose, methyl cellulose, or alkali metal salts thereof. The alkali metals may be Na, K, or Li. The thickener may be included in an amount of 0.1 parts by weight to 3 parts by weight based on 100 parts by weight of the negative active material.

The conductive material is included to provide electrode conductivity and any electrically conductive material may be used as a conductive material unless it causes a chemical change. Examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum silver, and the like; a conductive polymer such as a polyphenylene derivative; or a mixture thereof.

The current collector may include a copper foil, a nickel foil, a stainless steel foil, a titanium foil, a nickel foam, a copper foam, a polymer substrate coated with a conductive metal, and a combination thereof.

The electrolyte includes a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, or aprotic solvent.

The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester-based solvent may include methyl acetate, ethyl acetate, n-propyl acetate, dimethylacetate, methylpropionate, ethylpropionate, decanolide, mevalonolactone, caprolactone, and the like. The ether-based solvent may include dibutyl ether, tetraglyme, diglyme, dimethoxyethane, 2-methyltetrahydrofuran, tetrahydrofuran, and the like. In addition, the ketone-based solvent may include cyclohexanone, and the like. The alcohol based solvent may include ethanol, isopropyl alcohol, and the like, and the aprotic solvent may include nitriles such as R—CN (wherein R is a C2 to C20 linear, branched, or cyclic hydrocarbon group, a double bond, an aromatic ring, or an ether bond), and the like, amides such as dimethyl formamide, and the like, dioxolanes such as 1,3-dioxolane, and the like, sulfolanes, and the like.

The organic solvent may be used alone or in a mixture, and when the organic solvent is used in a mixture, the mixture ratio may be controlled in accordance with a desirable battery performance.

In addition, the carbonate-based solvent may include a mixture of a cyclic carbonate and a chain-type carbonate. In this case, when the cyclic carbonate and the chain-type carbonate may be mixed together in a volume ratio of 1:1 to 1:9, performance of an electrolyte solution may be enhanced.

The organic solvent may further include an aromatic hydrocarbon-based organic solvent in addition to the carbonate-based solvent. Herein, the carbonate-based solvent and the aromatic hydrocarbon-based organic solvent may be mixed in a volume ratio of 1:1 to 30:1.

The aromatic hydrocarbon-based organic solvent may be an aromatic hydrocarbon-based compound of Chemical Formula 3.

[Chemical Formula 3]

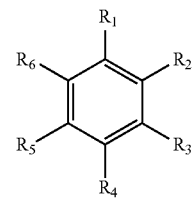

In Chemical Formula 3, $R_1$ to $R_6$ are the same or different and are selected from hydrogen, a halogen, a C1 to C10 alkyl group, a haloalkyl group, and a combination thereof.

Specific examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include an additive of vinylene carbonate or an ethylene carbonate-based compound of Chemical Formula 4 in order to improve cycle-life of a battery.

[Chemical Formula 4]

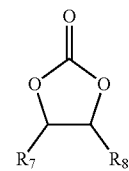

In Chemical Formula 4, $R_7$ and $R_8$ are the same or different, and selected from hydrogen, a halogen, a cyano group (CN), a nitro group ($NO_2$), and a fluorinated C1 to C5 alkyl group, provided that at least one of $R_7$ and $R_8$ is selected from a halogen, a cyano group (CN), a nitro group ($NO_2$), and a fluorinated C1 to C5 alkyl group and $R_7$ and $R_8$ are not simultaneously hydrogen.

Examples of the ethylene carbonate-based compound may be difluoro ethylenecarbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving cycle-life may be used within an appropriate range.

The lithium salt dissolved in an organic solvent supplies a battery with lithium ions, basically operates the rechargeable lithium battery, and improves transportation of the lithium ions between a positive electrode and a negative electrode. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein, x and y are natural numbers, for example an integer ranging from 1 to 20), LiCl, LiI, and $LiB(C_2O_4)_2$ (lithium bis(oxalato) borate: LiBOB). A concentration of the lithium salt may range from 0.1 M to 2.0 M.

When the lithium salt is included at the above concentration range, an electrolyte may have excellent performance and lithium ion mobility due to optimal electrolyte conductivity and viscosity.

In addition, a separator may be disposed between the positive electrode and the negative electrode depending on a type of the lithium secondary battery. Such a separator may include polyethylene, polypropylene, polyvinylidene fluoride, and multi-layers thereof such as a polyethylene/polypropylene double-layered separator, a polyethylene/polypropylene/polyethylene triple-layered separator, or a polypropylene/polyethylene/polypropylene triple-layered separator.

FIG. 1 is an exploded perspective view of a lithium secondary battery according to an embodiment of the invention. The lithium secondary battery according to an embodiment is illustrated as a prismatic battery but is not limited thereto and may include variously-shaped batteries such as a cylindrical battery, a pouch-type battery, and the like.

Referring to FIG. 1, a lithium secondary battery 100 according to an embodiment includes an electrode assembly 40 manufactured by winding a positive electrode 10, a negative electrode 20, and a separator 30 disposed therebetween, a case 50 including the electrode assembly 40, and a case 50 housing the electrode assembly 40. The positive electrode 10, the negative electrode 20, and the separator 30 are impregnated in an electrolyte solution (not shown).

EXAMPLES

Hereinafter, examples of the invention and comparative examples are described. These examples, however, are not in any sense to be interpreted as limiting the scope of the invention.

Experimental Example 1

Lithium carbonate, cobalt oxide, and titanium oxide were dry-mixed in a Henschel mixer for about 3 minutes to prepare a mixture having a Li:Co:Ti mole ratio of 100:99.3:0.7. The mixture was fired at 1020° C. for 10 hours, pulverized and sieved to prepare $Li_{1-u}Mg_uCo_{1-t}M^2_tO_2$ (u=0, $M^2$=Ti, t=0.007, i.e., $LiCo_{0.993}Ti_{0.007}O_2$) active material having an average particle diameter (D50) of 17 μM.

Experimental Example 2

Lithium carbonate, cobalt oxide, magnesium carbonate, and titanium oxide were dry-mixed in a Henschel mixer for about 3 minutes to prepare a mixture having a Li:Co:Mg:Ti mole ratio of 99.5:99.3:0.5:0.7. The mixture was fired at 1020° C. for 10 hours, pulverized and sieved to prepare $Li_{1-u}Mg_uCo_{1-t}M^2_tO_2$ (u=0.005, $M^2$=Ti, t=0.007, u/(1-t)=about 0.005, i.e., $Li_{0.995}Mg_{0.005}Co_{0.993}Ti_{0.007}O_2$) active material having an average particle diameter (D50) of 17 μm.

Experimental Example 3

$Li_{1-u}Mg_uCo_{1-t}M^2_tO_2$ (u=0.01, $M^2$=Ti, t 0.007, u/(1/t)=about 0.01, i.e., $Li_{0.99}Mg_{0.01}Co_{0.993}Ti_{0.007}O_2$) active material having an average particle diameter (D50) of 17 μm was prepared according to the same manner as in Experimental Example 2 except that lithium carbonate, cobalt oxide, magnesium carbonate, and titanium oxide were mixed in a Li:Co:Mg:Ti mole ratio of 99:99.3:1:0.7.

Experimental Example 4

$Li_{1-u}Mg_uCo_{1-t}M^2_tO_2$ (u=0.02, $M^2$=Ti, t=0.007, u/(1-t)=about 0.02, i.e., $Li_{0.98}Mg_{0.02}Co_{0.993}Ti_{0.007}O_2$) active material having an average particle diameter (D50) of 17 μm was prepared according to the same manner as in Experimental Example 2 except that lithium carbonate, cobalt oxide, magnesium carbonate, and titanium oxide were mixed in a Li:Co:Mg:Ti mole ratio of 98:99.3:2:0.7.

Experimental Example 5

$Li_{1-u}Mg_uCo_{1-t}M^2_tO_2$ (u=0.03, $M^2$=Ti, t=0.007, u/(1-t)=about 0.03, i.e., $Li_{0.97}Mg_{0.03}Co_{0.993}Ti_{0.007}O_2$) active material having an average particle diameter (D50) of 17 μm was prepared according to the same manner as in Experimental Example 2 except that lithium carbonate, cobalt oxide, magnesium carbonate, and titanium oxide were mixed in a Li:Co:Mg:Ti mole ratio of 97:99.3:3:0.7.

Lattice constants of the active materials prepared according to Experimental Examples 1 to 5 were obtained by X-ray diffraction measurement using CuKα rays. The measured a length and c length are shown in Table 1. In Table 1, V(Å$^3$) represents a volume of a unit cell.

TABLE 1

| | Mg doping amount (mol %) | Atomic ratio of Mg/Co | a axis length (Å) | c axis length (Å) | c/a | V (Å$^3$) |
|---|---|---|---|---|---|---|
| Experimental Example 1 | 0 | 0 | 2.8149 | 14.0467 | 4.99 | 96.39 |
| Experimental Example 2 | 0.5 | 0.005 | 2.8147 | 14.0497 | 4.99 | 96.40 |
| Experimental Example 3 | 1 | 0.01 | 2.8145 | 14.0510 | 4.99 | 96.39 |
| Experimental Example 4 | 2 | 0.02 | 2.8149 | 14.0511 | 4.99 | 96.42 |
| Experimental Example 5 | 3 | 0.03 | 2.8151 | 14.0529 | 4.99 | 96.45 |

As shown in Table 1, even though the Mg content increases to 3 mol %, the a-axis length of does not change within the effective number range, but the c-axis length increases as the Mg doping amount increases. These results show that Mg substitutes a part of Li, that is, is inserted and positioned in place of Li site.

Experimental Example 6

$Li_{1-u}Mg_uCo_{1-t}M^2_tO_2$ (u=0.0075, $M^2$=Ti, t=0.007, u/(1−t)=about 0.0075, i.e., $Li_{0.9925}Mg_{0.0075}Co_{0.993}Ti_{0.007}O_2$) active material having an average particle diameter (D50) of 17 μm was prepared according to the same manner as in Experimental Example 2 except that lithium carbonate, cobalt oxide, magnesium carbonate, and titanium oxide were mixed in a Li:Co:Mg:Ti mole ratio of 99.75:99.3:0.25:0.7.

Experimental Example 7

$Li_{1-u}Mg_uCo_{1-t}M^2_tO_2$ (u=0.00375, $M^2$=Ti, t=0.007, u/(1−t)=about 0.00375, i.e., $Li_{0.99625}Mg_{0.00375}Co_{0.993}Ti_{0.007}O_2$) active material having an average particle diameter (D50) of 17 μm was prepared according to the same manner as in Experimental Example 2 except that lithium carbonate, cobalt oxide, magnesium carbonate, and titanium oxide were mixed in a Li:Co:Mg:Ti mole ratio of 99.625:99.3:0.375:0.7.

Experimental Example 8

$Li_{1-u}Mg_uCo_{1-t}M^2_tO_2$ a (u=0.00625, $M^2$=Ti, t=0.007, u/(1−t)=about 0.00625, i.e., $Li_{0.99375}Mg_{0.00625}Co_{0.993}Ti_{0.007}O_2$) active material having an average particle diameter (D50) of 17 μm was prepared according to the same manner as in Experimental Example 2 except that lithium carbonate, cobalt oxide, magnesium carbonate, and titanium oxide were mixed in a Li:Co:Mg:Ti mole ratio of 99.375:99.3:0.625:0.7.

Experimental Example 9

$Li_{1-u}Mg_uCo_{1-t}M^2_tO_2$ (u=0.0075, $M^2$=Ti, t=0.007, u/(1−t)=about 0.0075, i.e., $Li_{0.9925}Mg_{0.0075}Co_{0.993}Ti_{0.007}O_2$) active material having an average particle diameter (D50) of 17 μm was prepared according to the same manner as in Experimental Example 2 except that lithium carbonate, cobalt oxide, magnesium carbonate, and titanium oxide were mixed in a Li:Co:Mg:Ti mole ratio of 99.25:99.3:0.75:0.7.

Positive active material slurry was each prepared by mixing each active material according to Experimental Examples 1 to 9, a ketjen black conductive material, and a polyvinylidene fluoride binder in an N-methyl-2-pyrrolidone solvent in a weight ratio of 94:3:3. The slurry was each coated on an Al-foil current collector, and each positive electrode was prepared by a drying and rolling process.

2016 coin-type half-cells were manufactured using the prepared positive electrodes and lithium metal counter electrodes. Herein, 1M $LiPF_6$ dissolved in a mixed solvent (50:50 volume ratio) of ethylene carbonate and dimethyl carbonate was used.

Figure 2:
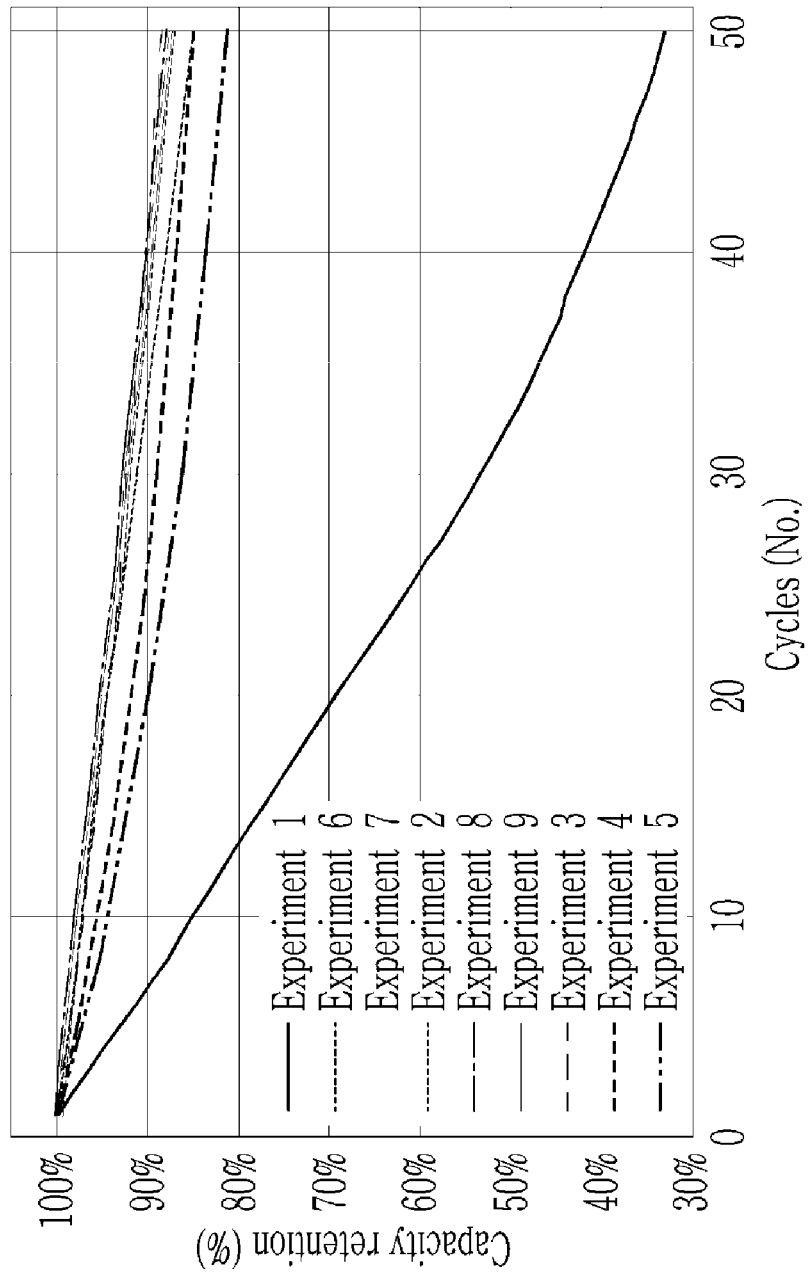
FIG. 2 is a graph showing cycle-life characteristics of half-cells manufactured using the active materials prepared according to Experimental Examples 1 to 9.

The battery cells manufactured according to Experimental Examples 1 to 9 were charged and discharged 50 times at 1 C at 25° C., and the discharge capacities were measured and shown in FIG. 2. As shown in FIG. 2, in Experimental Example 1, where Mg was not doped, greatly degraded cycle-life characteristics were obtained and even when Mg is doped, in the case of Experimental Examples 4 and 5 in which an excess of 1 mol % is doped, cycle-life characteristics were also degraded. Therefore, when a compound doped with more than 1 mol % of Mg is used as the second positive active material, even if it is mixed with the first positive active material of Chemical Formula 1, it can be predicted that cycle-life characteristics will be degraded.

Example 1

Lithium carbonate, manganese oxide, and cobalt oxide were dry-mixed in a Henschel mixer for about 3 minutes to prepare a mixture having a Li:Mn:Co mole ratio of 1.2:0.4:0.4. The mixture was fired at 500° C. for 10 hours, pulverized, and sieved to obtain a $LiaMnxCoyM1kO2$ (a=1.2, x=0.4, y=0.4, k=0, i.e., Li1.2Mn0.4Co0.4O2) first positive active material having an average particle diameter (D50) of 3 μm.

Lithium carbonate, cobalt oxide, magnesium carbonate, and titanium oxide were dry-mixed in a Henschel mixer for about 3 minutes to prepare a mixture having a Li:Co:Mg:Ti mole ratio of 99.5:99.8:0.5:0.2. The mixture was fired at 1020° C. for 10 hours, pulverized and sieved to prepare a Li1−uMguCo1−tM2tO2 (u=0.005, M2=Ti, t=0.002, u/(1−t)=about 0.005, i.e., Li0.995Mg0.005Co0.998Ti0.002O02) second positive active material having an average particle diameter (D50) of 17 μm. Herein, the atomic ratio of Mg/Co was about 0.005.

A positive active material was prepared by mixing the first positive active material and the second positive active material at 5:95 wt %. Herein, the average particle diameter (D50) of the second positive active material/the first positive active material was about 5.67.

Example 2

A positive active material was prepared in the same manner as in Example 1, except that the first positive active material and the second positive active material were mixed at 10:90 wt %.

Comparative Example 1

A positive active material was prepared in the same manner as in Example 1, except that the second positive active material was used alone.

Cell Characteristics

Positive active material slurry was each prepared by mixing each positive active material prepared according to the Example 1 to 2 and Comparative Example 1, a ketjen black conductive material, and a polyvinylidene fluoride binder in an N-methyl-2-pyrrolidone solvent in a weight ratio of 94:3:3. The slurry was each coated on an Al-foil current collector, and each positive electrode was prepared by a drying and rolling process.

2016 coin-type half-cells were manufactured using the prepared positive electrodes and lithium metal counter electrodes. Herein, 1M $LiPF_6$ dissolved in a mixed solvent (50:50 volume ratio) of ethylene carbonate and dimethyl carbonate was used.

Figure 3:
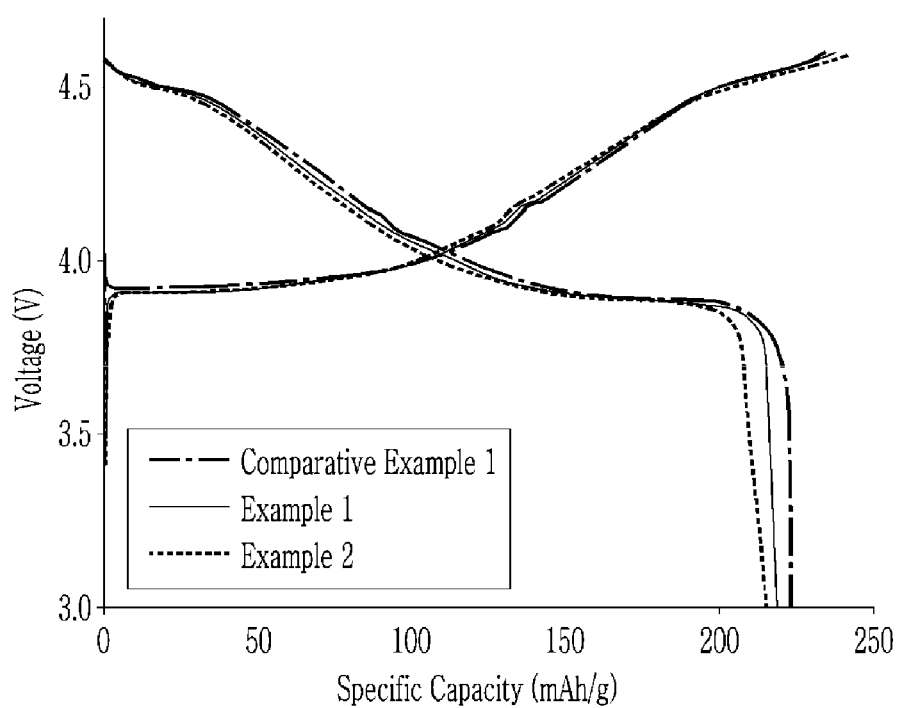
FIG. 3 is a graph showing charge and discharge characteristics of half-cells manufactured using the positive active materials of Examples 1 and 2 and Comparative Example. 1.

The battery cells were charged and discharged at 0.1 C once, the charge and discharge capacities were measured, and the results are shown in Table 1 and FIG. 3. In addition, according to the measured charge and discharge capacity results, ratios of 1st discharge capacity to 1st discharge capacity were calculated, and the results are shown as discharge/charge efficiency (%) in Table 2. In addition, the following discharge/charge efficiency is a value obtained in the half-cell, and since the efficiency in the actual full cell does not exceed 91.5%, in the case of Comparative Example 1 and Example 1, the efficiency of 91.5% was assumed and in case of Example 2, the efficiency value of 88.5% that was obtained as a half-cell was assumed, and the positive electrode reversible capacities in the full cells were obtained and shown in Table 2.

TABLE 2

| | Positive active material | Amount (wt %) | 1st charge (mAh/g) | 1st discharge (mAh/g) | Discharge/ charge efficiency (%) | Reversible capacity of positive electrode in full cell (mAh/g) (Assuming that 1st discharge/charge efficiency of the negative electrode is 91.5%) |
|---|---|---|---|---|---|---|
| Comparative Example 1 | $Li_{0.995}Mg_{0.005}Co_{0.998}Ti_{0.002}O_2$ | 100 | 234.6 | 223.3 | 95.2% | 234.6 * 0.915 = 214. |
| Example 1 | $Li_{1.2}Mn_{0.4}Co_{0.4}O_2$ $Li_{0.995}Mg_{0.005}Co_{0.998}Ti_{0.002}O_2$ | 5 95 | 237.3 | 219.1 | 92.3 | 237.3 * 0.915 = 217.1 |
| Example 2 | $Li_{1.2}Mn_{0.4}Co_{0.4}O_2$ $Li_{0.995}Mg_{0.005}Co_{0.998}Ti_{0.002}O_2$ | 10 90 | 243.4 | 215.5 | 88.5 | 243.4 * 0.885 = 215.4 |

As shown in the Table 2, 1st charge capacities of Examples 1 and 2 were higher than that of Comparative Example 1. In addition, the positive electrode reversible capacities results of Examples 1 and 2 in the full cells were also superior to Comparative Example 1.

In addition, as shown in FIG. 3, the charging capacities of Examples 1 and 2 were higher than those of Comparative Example 1.

While this invention has been described in connection with what is presently considered to be practical example embodiments, it is to be understood that the invention is not limited to the disclosed embodiments, and on the contrary, it is intended to cover various modifications and equivalent arrangements included within the spirit and scope of the appended claims.

The invention claimed is:

1. A lithium secondary battery comprising
a positive electrode, a negative electrode comprising a negative active material, and an electrolyte,
wherein the positive electrode includes a first positive active material of a lithium manganese cobalt-based oxide represented by the formula:

$$Li_aMn_xCo_yM^1_kO_2$$

where a=1.2−b, x=0.4−2b, y=0.4−k+3b, 0≤b≤0.03, 0≤k≤0.4, a+x+y+k=2, and
$M^1$ is Cr, Ru, or a combination thereof; and
a second positive active material of a lithium transition metal oxide that intercalates and deintercalates lithium ions,
an average particle diameter of the first positive active material is smaller than an average particle diameter of the second positive active material, and
the first positive active material in combination with the second positive active material has a lower first charge/discharge efficiency than that of the second positive active material by itself and not in combination with the first positive active material, and wherein the first positive active material in combination with the second positive active material has a reversible capacity during the first charge/discharge which is larger than a reversible capacity of the second positive active material by itself and not in combination with the first positive active material during the first charge/discharge:
wherein the second positive active material is a lithium cobalt oxide represented by the formula:

$$Li_{1-u}Mg_uCo_{1-t}M^2_tO_{2-z}M^3_z$$

wherein 0<u≤0.01, 0≤t<0.02, 0≤z<0.01, is Group 3 to 13 elements, $M^2$ is selected from a group consisting of the Group 3 to 13 elements, and $M^3$ is F, Cl, Br, or a combination thereof.

2. The lithium secondary battery of claim 1, wherein $M^2$ is Ti, V, Ni, Fe, Nb, Mo, Al, Zr, Mn, or a combination thereof.

3. The lithium secondary battery of claim 1, wherein the average particle diameter of the first positive active material is 1 μm to 5 μm.

4. The lithium secondary battery of claim 1, wherein the average particle diameter of the second positive active material is 10 μm to 20 μm.

5. The lithium secondary battery of claim 1, wherein a ratio of the average particle diameter of the second positive electrode active material to the average particle diameter of the first positive electrode active material is 2 to 20.

6. The lithium secondary battery of claim 1, wherein a mixing ratio of the first positive electrode active material and the second positive electrode active material is a 10:90 to 1:99 weight ratio.

7. The lithium secondary battery of claim 2, wherein an atomic ratio (u/(1−t)) of Mg/Co in the second positive active material is 0.0035 to 0.01.

* * * * *